United States Patent
Oh (10) Patent No.: US 10,985,646 B2
(45) Date of Patent: Apr. 20, 2021

(54) CONTINUOUS CONDUCTION BOOST CONVERTER WITH ZERO VOLTAGE SWITCHING AND POWER FACTOR CORRECTION

(71) Applicant: Apple Inc., Cupertino, CA (US)

(72) Inventor: InHwan (Simon) Oh, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/194,780

(22) Filed: Nov. 19, 2018

(65) Prior Publication Data

US 2020/0059151 A1 Feb. 20, 2020

Related U.S. Application Data

(60) Provisional application No. 62/718,571, filed on Aug. 14, 2018.

(51) Int. Cl.
*H02M 1/08* (2006.01)
*H02M 1/44* (2007.01)
(Continued)

(52) U.S. Cl.
CPC .......... *H02M 1/083* (2013.01); *H02M 1/126* (2013.01); *H02M 1/4241* (2013.01); *H02M 1/44* (2013.01);
(Continued)

(58) Field of Classification Search
CPC .... H02M 1/083; H02M 1/126; H02M 1/4241; H02M 1/44; H02M 3/156–158;
(Continued)

(56) References Cited

U.S. PATENT DOCUMENTS 4,437,146 A * 3/1984 Carpenter ........... H02M 1/4225
    323/222
4,959,602 A * 9/1990 Scott ................. H02M 5/45
    318/762

(Continued)

OTHER PUBLICATIONS

Golbon, Navid and Gerry Moschopoulos, "Analysis and Design of a Higher Current ZVS-PWM Converter for Industrial Applications," Electronics, 2013, 2, Mar. 8, 2013.

(Continued)

*Primary Examiner* — Yemane Mehari
(74) *Attorney, Agent, or Firm* — Blank Rome LLP (57) ABSTRACT

A ZVS boost converter can include a boost inductor coupled to a DC voltage bus, a main switch configured to selectively store energy from the DC voltage bus in the boost inductor and deliver the stored energy to a load, a synchronous rectifier, and a resonant circuit coupled across the main switch. The resonant circuit can allow for zero voltage switching of the main switch and the synchronous rectifier switch. The resonant circuit can be a series resonant RC circuit. The boost converter can be operated in a continuous current mode, with the main switch operated at a constant frequency with a variable duty cycle to maintain output voltage regulation and the synchronous rectifier operated complementarily to the main switch. The duty cycle of the main switch can be controlled using a current window controller. The ZVS boost converter may be incorporated in a power factor corrected AC-DC converter.

24 Claims, 4 Drawing Sheets

(51) Int. Cl.
*H02M 1/12* (2006.01)
*H02M 3/158* (2006.01)
*H02M 1/42* (2007.01)
*H02M 1/00* (2006.01)

(52) U.S. Cl.
CPC .. *H02M 3/1588* (2013.01); *H02M 2001/0009* (2013.01); *H02M 2001/0058* (2013.01)

(58) Field of Classification Search
CPC ............. H02M 3/1584; H02M 3/1588; H02M 2001/0009; H02M 2001/0058
USPC ...................................................... 363/39, 44
See application file for complete search history.

(56) References Cited

U.S. PATENT DOCUMENTS

| | | | | |
|---|---|---|---|---|
| 6,194,880 | B1* | 2/2001 | Fraidlin | H02M 3/1588 323/222 |
| 7,053,594 | B2* | 5/2006 | Sutardja | H02M 1/088 323/283 |
| 2007/0171680 | A1* | 7/2007 | Perreault | H02M 1/34 363/16 |
| 2008/0094861 | A1* | 4/2008 | Wang | H02M 3/156 363/21.11 |
| 2009/0021966 | A1* | 1/2009 | Jacobson | H02M 1/34 363/52 |
| 2017/0170734 | A1* | 6/2017 | Sheng | H02M 3/33507 |
| 2017/0302176 | A1* | 10/2017 | Leong | H02M 3/158 |

OTHER PUBLICATIONS

Gurunathan, Ranganathan and Ashoka K. S. Bhat, "A Zero-Voltage Transition Boost Converter Using a Zero-Voltage Switching Auxiliary Circuit," IEEE Transactions on Power Electronics, vol. 17, No. 5, Sep. 2002.

Szychta, E., "ZVS Operating Region of Multiresonant DC/DC Boost Converter," Advanced in Electrical and Electronic Engineering, 2011.

* cited by examiner

CONTINUOUS CONDUCTION BOOST CONVERTER WITH ZERO VOLTAGE SWITCHING AND POWER FACTOR CORRECTION

BACKGROUND

Boost converters are one type of switching power converters used to provide regulated power sources for a variety of electronic devices. As the power requirements of electronic devices increase, efficiency of the power converters becomes more and more important. One disadvantage of conventional boost converters is that the main switch is turned on with a relatively high voltage across the switch. The high voltage across the switch corresponds to energy stored in the drain to source capacitance of the switching device (e.g., a metal oxide semiconductor field effect transistor a/k/a MOSFET). The energy stored in this drain to source capacitance is discharged when the switch is closed and is essentially wasted.

In other types of switching converters, zero voltage switching ("ZVS") has been implemented to reduce such losses. Despite the interest in ZVS converters, particularly for continuous current mode DC-DC boost converters with power factor correction, the inventor is not aware of a boost converter implementation with zero voltage switching for all switching devices. However, such a converter is disclosed herein, which can provide for increased efficiency and power density.

SUMMARY

A zero voltage switching boost converter can include a DC voltage bus, a boost inductor coupled to the DC voltage bus, a main switch configured to selectively store energy from the DC voltage bus in the boost inductor and deliver energy from the boost inductor to a load connected to the boost converter, a synchronous rectifier switch configured to allow current flow from the boost inductor to the load and to prevent current flow from the load to the boost inductor, and a resonant circuit comprising a resonant capacitor and a resonant inductor coupled across the main switch, wherein the resonant circuit can allow for zero voltage switching of the main switch and the synchronous rectifier switch. The resonant circuit can be a series resonant circuit.

The boost converter can be operated in a continuous current mode. The main switch can be switched at a constant frequency, or variable switching frequency, and a duty cycle of the main switch can be controlled to regulate an output voltage of the converter. The duty cycle of the main switch can be controlled using a current window controller. The current window controller can include a current sensor configured to measure current through the boost inductor, a first comparator configured to compare the measured boost inductor current to an upper reference current, a second comparator configured to compare the measured boost inductor current to a lower reference current, a flip-flop having its inputs coupled to the outputs of the first and second comparators, and a gate driver circuit having an input coupled to an output of the flip-flop and its outputs coupled to gate terminals of the main switch and the synchronous rectifier switches, wherein the gate driver circuit is configured to complementarily switch the main switch and the auxiliary switch with a dead time between switching events. The auxiliary switch can be switched complementarily to the main switch. There can be a dead time between switching off one of the main switch and the auxiliary switch and switching on the other of the main switch and the auxiliary switch.

A power factor corrected AC-DC converter can include an electromagnetic interference filter configured to receive an AC input voltage and generate a filtered AC voltage, a first rectifier coupled to the electromagnetic interference filter and configured to rectify the filtered AC voltage to produce a DC bus voltage, a boost inductor coupled to the DC voltage bus, a main switch configured to selectively store energy from the DC voltage bus in the boost inductor and deliver energy from the boost inductor to a load connected to the boost converter, a synchronous rectifier switch configured to allow current flow from the boost inductor to the load and to prevent current flow from the load to the boost inductor, and a resonant circuit comprising a resonant capacitor and a resonant inductor coupled across the main switch, wherein the resonant circuit allows for zero voltage switching of the main switch and the synchronous rectifier switch. The resonant circuit can be a series resonant circuit.

The power factor corrected AC-DC converter can be operated in a continuous current mode. The main switch can be switched at a constant frequency, or variable switching frequency, and a duty cycle of the main switch can be controlled to regulate an output voltage of the converter. The duty cycle of the main switch can be controlled using a current window controller. The current window controller can include a current sensor configured to measure current through the boost inductor, a first comparator configured to compare the measured boost inductor current to an upper reference current, a second comparator configured to compare the measured boost inductor current to a lower reference current, a flip-flop having its inputs coupled to the outputs of the first and second comparators, and a gate driver circuit having an input coupled to an output of the flip-flop and its outputs coupled to gate terminals of the main switch and the synchronous rectifier switches, wherein the gate driver circuit is configured to complementarily switch the main switch and the auxiliary switch with a dead time between switching events. The auxiliary switch can be switched complementarily to the main switch. There can be a dead time between switching off one of the main switch and the auxiliary switch and switching on the other of the main switch and the auxiliary switch.

A power converter can include a DC voltage bus, a boost inductor having a first terminal coupled to a high rail of the DC voltage bus, a synchronous rectifier switch having a first terminal coupled to a second terminal of the boost inductor and a second terminal configured to be coupled to a load, wherein the rectifier is configured to allow current flow from the boost inductor to the load and to prevent current flow from the load to the boost inductor, a main switch coupled between a junction of the second terminal of the boost inductor and the first terminal of the rectifier and the low rail of the DC voltage bus, and a series resonant circuit in parallel with the main switch. The main switch can be switched at a constant frequency and a variable duty cycle to maintain a regulated output voltage at the load by selectively storing energy from the DC voltage bus in the boost inductor and delivering energy from the boost inductor to a load connected to the boost converter. The auxiliary switch can be switched complementarily to the main switch. As a result, the series resonant circuit can allow for zero voltage switching of the main switch and the auxiliary switch. The power converter can further include an electromagnetic interference filter configured to receive an AC input voltage and generate a filtered AC voltage and a second rectifier having an input coupled to the electromagnetic interference filter and an output coupled to the DC bus. The rectifier can be configured to rectify the filtered AC voltage to produce a DC bus voltage.

A method of operating a boost converter can include switching a main switch to selectively store energy from a DC voltage bus in a boost inductor and deliver energy from the boost inductor to a load connected to the boost converter, wherein a voltage supplied to the load is greater than the DC bus voltage and switching an auxiliary switch complementarily to the main switch, wherein switching the main switch and the synchronous rectifier switch operate a resonant circuit coupled in parallel with the main switch to cause zero voltage switching of the main switch and the auxiliary switch. The method can further include operating the main switch at a constant frequency, and a duty cycle of the main switch is controlled to regulate an output voltage of the converter.

DETAILED DESCRIPTION

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth in order to provide a thorough understanding of the implementations described herein. In other instances, methods, procedures and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

Figure 1:
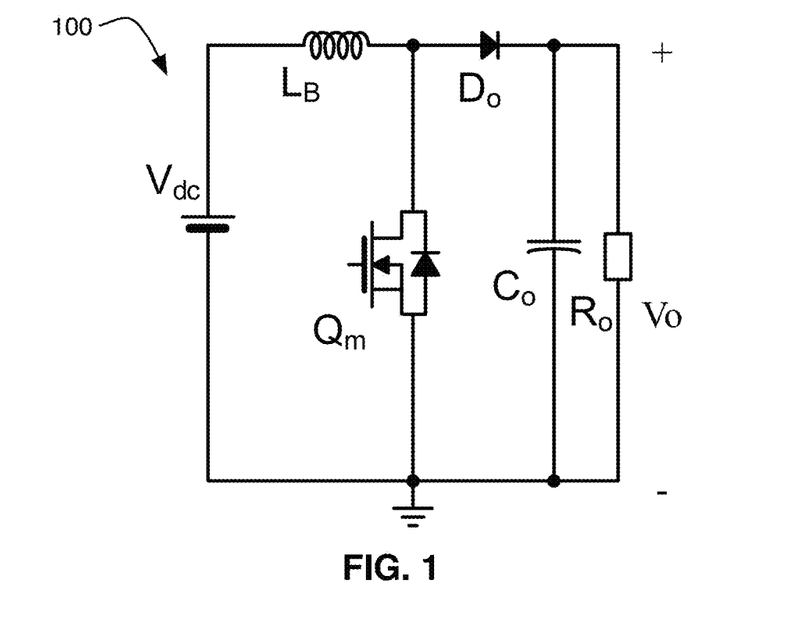
FIG. 1 illustrates a boost DC/DC converter.

FIG. 1 depicts a conventional DC/DC boost converter 100. A DC voltage VDC is imposed across the upper and lower rails of the boost converter. The boost converter includes a boost inductor Lb, a switching device Qm, and a boost/output diode Do. The boost converter may also include an output capacitor Co, and may deliver a regulated output DC voltage Vo to a load represented by Ro. This regulated output DC voltage Vo may be higher than the DC bus voltage VDC.

Operation of boost converter 100 may be conventional and is only be briefly summarized herein. To start the boost conversion cycle, switch Qm is closed, which causes a linearly increasing current to flow through boost inductor Lb. At a time determined by the control system (not shown), switch Qm is opened. Because the current flowing through boost inductor Lb cannot change instantaneously, the magnetic field of inductor Lb will cause an increase in electromotive force (EMF) to a level greater than regulated output voltage Vo, thereby causing current to flow through diode Do to output capacitor Co and load Ro. As the energy stored in boost inductor Lb is transferred to output capacitor Co and load Ro, the EMF generated by the inductor will decrease until boost diode Do becomes back-biased, and current flow from boost inductor Lb to the load ceases with DCM (Discontinuous-Current-Mode) operation. Load Ro may continue to be supplied current by output capacitor Co. At a time determined by the control system (not shown), switch Qm will again be turned on, repeating the cycle. Controlling the frequency and/or duty cycle of switch Qm may be used to control the regulated output voltage. In many embodiments, the switching frequency of Qm will vary in the range of kilohertz to hundreds of kilohertz, although both lower and higher frequencies could be used.

The foregoing description is what is known as discontinuous current mode operation for the boost converter. The boost converter may also operate in a critical current mode, or in a continuous current mode. Discontinuous current mode (DCM) refers to a mode of operation in which the current through boost inductor Lb is sometimes positive and is sometimes zero, meaning that Qm remains off for a sufficient period of time for substantially all of the energy stored in boost inductor Lb to be delivered to the load, and there is some period of time between the end of one "cycle" and the beginning of the next during which there is no current flow through boost inductor Lb. Critical current mode refers to a mode of operation in which main switch Qm is switched on again immediately when the current through boost inductor Lb reaches zero. Finally, continuous current mode (CCM) refers to a mode of operation in which the current through boost inductor Lb is never allowed to reach zero. In other words, Qm will be closed again, starting a new switching cycle, while current is still flowing through boost inductor Lb and boost diode Do.

The converter and operation modes described above can be adversely affected by certain operating inefficiencies. More specifically, main switch Qm may have relatively high turn on switching losses because Qm is turned on with a high drain to source voltage. If the boost converter depicted in FIG. 1 is operated in the discontinuous or critical current modes, the drain to source voltage of Qm at the time Qm is turned on would be less or equal Vo. If the boost converter depicted in FIG. 1 is operated in the continuous current mode, the drain to source voltage across Qm will be Vo, (Vo>>VDC), due to the conduction of boost diode Do before Qm is turned ON by contribution of the EMF of boost inductor Lb. In addition, there can be a high spike current flowing through Qm from the boost diode Do because the boost diode Do has a reverse recovery time and cannot stop its flowing current immediately. In either case, this relatively high drain to source voltages store energy in the parasitic drain to source capacitance of main switch Qm. The discharge of this stored energy when main switch Qm is turned on creates switching losses. These switching losses will also increase with increases in switching frequency. Additionally, boost diode Do will exhibit conduction losses because of the forward voltage drop across the diode (e.g., 0.7V for a conventional silicon diode). These conduction losses are proportional to the square of the current delivered by the converter, meaning that for a constant output voltage, doubling the output current will quadruple the conduction losses associated with diode Do. Finally, high rates of change of the drain to source voltage of main switch Qm (i.e., high dVDs/dt) can cause electromagnetic interference issues.

Figure 2:
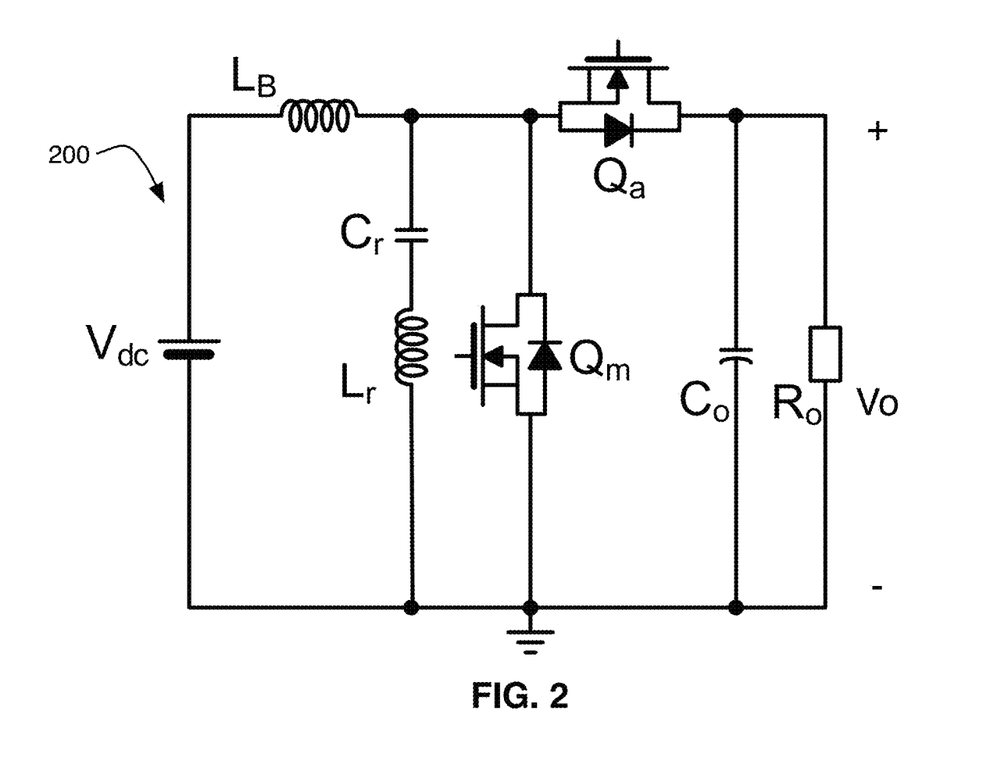
FIG. 2 illustrates a DC/DC boost converter operable in continuous current mode with zero voltage switching.

To address at least some of these (and other) issues, an improved boost converter 200, depicted in FIG. 2 may be employed. FIG. 2 uses reference numbers corresponding to the reference numbers for corresponding components (where applicable) used in describing the conventional converter 100 depicted in FIG. 1.

Boost converter 200 includes a boost inductor Lb, a main switching device Qm, and synchronous rectifier switch Qa (replacing boost diode Do). The boost converter may also include an output capacitor Co, and may deliver a regulated output DC voltage Vo to a load represented by Ro. As with converter 100 discussed above, this regulated output DC voltage Vo may be higher than the DC bus voltage VDC. In addition, the boost converter of converter 200 includes a resonant circuit made up of resonant capacitor Cr and resonant inductor Lr in parallel with main switch Qm.

The resonant circuit made up of resonant capacitor Cr and resonant inductor Lr may be used to achieve zero voltage switching (ZVS) of main switch Qm and to achieve zero current switching (ZCS) of synchronous rectifier switch Qa, which can substantially reduce the switching losses for main switch Qm and reduce or eliminate the reverse recovery peak current. Additionally, the resulting smoothing of the drain to source voltage transitions around the switching events can substantially improve the EMI performance of the circuit. As with the converter 100, converter 200 may be operated in the discontinuous, critical, or continuous current modes, although the advantages of the improved circuit may be more pronounced when used in the continuous current mode.

Figure 3:
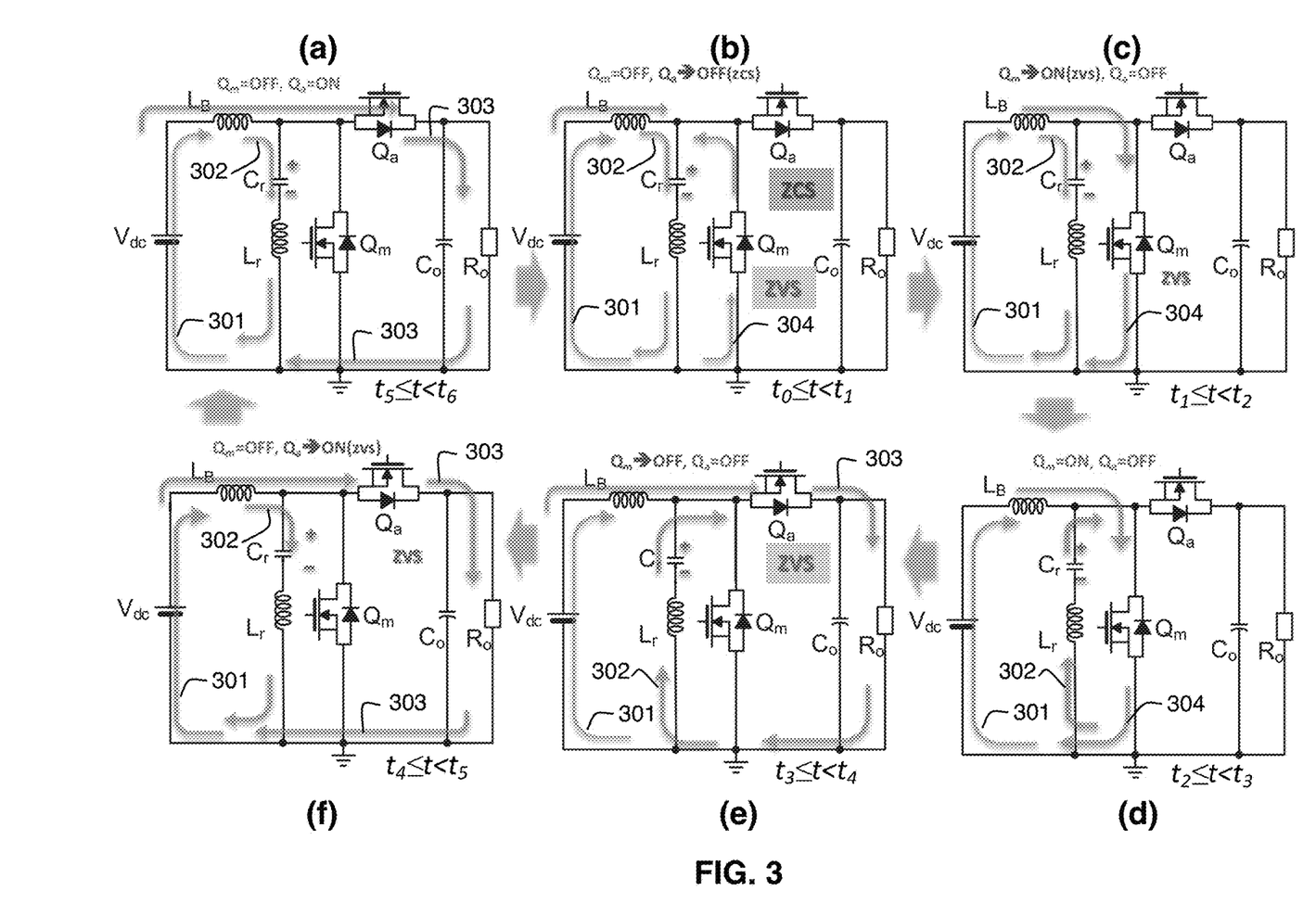
FIG. 3 illustrates a series of switching states for a DC/DC boost converter operable in continuous current mode with zero voltage switching.
Figure 4:
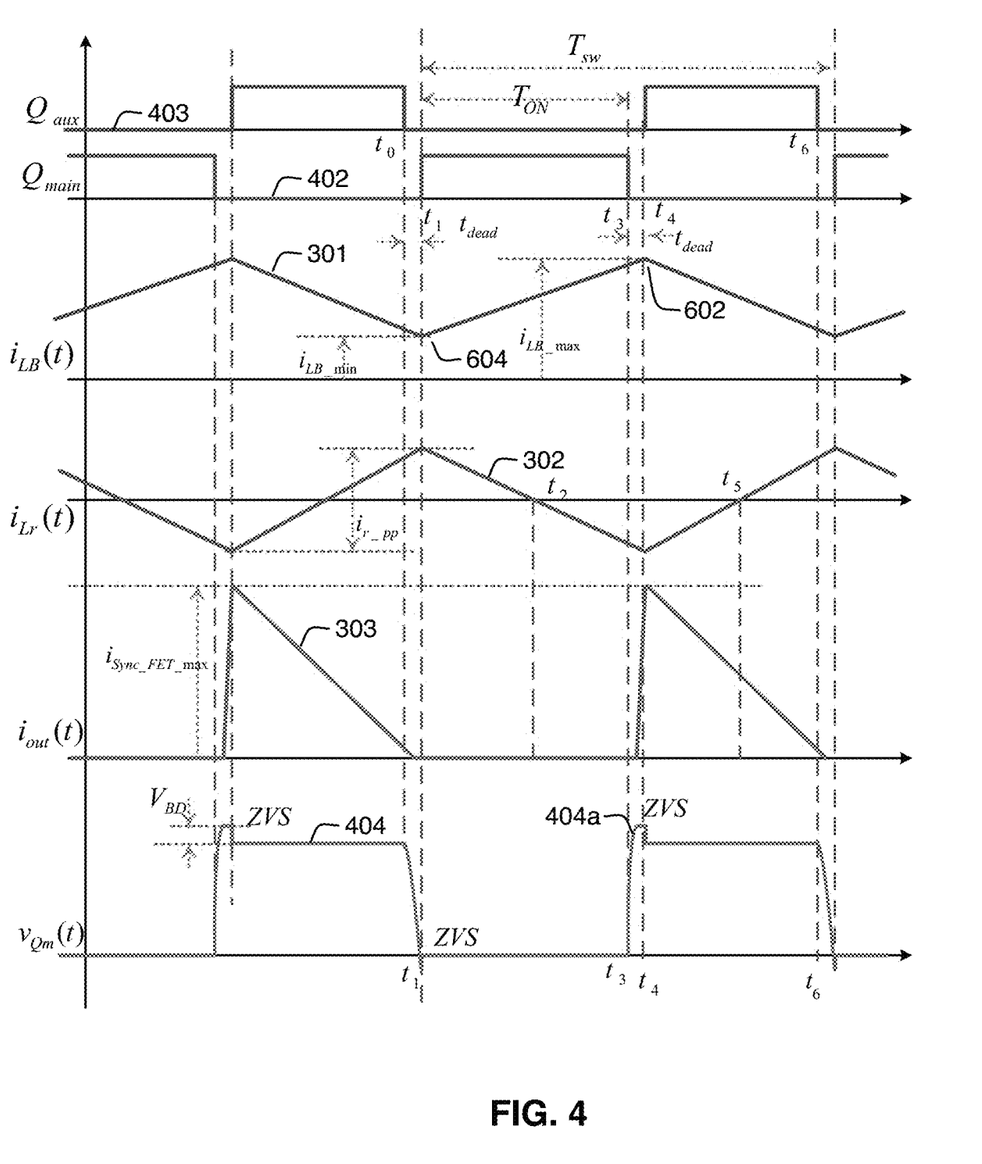
FIG. 4 illustrates various waveforms for a DC/DC boost converter operable in continuous current mode with zero voltage switching operated as depicted in FIG. 3.

Operation of converter 200 in the continuous current mode is depicted in FIG. 3, which illustrates six blocks (a)-(f) depicting the operating sequence. FIG. 4 depicts pertinent voltage and current waveforms associated with the operation events, and corresponding reference numbers are used where appropriate. It will be appreciated that these blocks depict the "steady state" operation of the converter, and do not show startup, although one ordinarily skilled in the art will understand that there are slight variations associated with startup of the circuit.

Block (a) of FIG. 3 depicts the time period while main switch Qm is off and synchronous rectifier switch Qa is on (having turned on in a ZVS condition in block (f), as discussed below). As can be seen with reference to FIG. 4, this is the time period beginning at time t5, when current 302 through resonant inductor Lr becomes positive, and ending at t6 (also t0) when synchronous rectifier switch Qa is turned off (as depicted in block (b), discussed below). During this time period, boost inductor current 301 is decreasing, as energy stored in the boost inductor Lb is delivered to the load via output current/synchronous rectifier current 303. As can be seen in the waveforms of FIG. 4, output current/synchronous rectifier current 303 is decreasing as energy from boost inductor Lb is transferred to the load and also into the resonant circuit made up of resonant capacitor Cr and resonant inductor Lr.

When the output current/synchronous rectifier current 303 reaches zero at time t6 (FIG. 4), synchronous rectifier switch Qa is opened. This marks the transition from block (a) of FIG. 3 to block (b) of FIG. 3. Because synchronous rectifier switch Qa is opened in a zero current switching (ZCS) condition, voltage stresses in the circuit may be lower, and the efficiency of the converter may also be higher. Once the synchronous rectifier switch Qa is opened, output current 303 must remain at zero. However, because current 301 flowing through boost inductor Lb and resonant current 302 flowing through resonant inductor Lr cannot change instantaneously, a (reverse) switch current 304 begins to flow through the intrinsic body diode of main switch Qm. This reverse switch current 304 is the difference between the boost inductor current 301 and the resonant current 302 (as seen in FIG. 4) and allows switch Qm to close under a zero voltage switching (ZVS) condition after a short dead time at time t1 (FIG. 4). This marks the transition to block (c) in FIG. 3.

In block (c) of FIG. 3, main switch Qm is on (having been turned on in a ZVS condition) and synchronous rectifier switch Qa is off with zero current switching. As a result, output current/synchronous rectifier current 303 remains at zero. During this phase (i.e., when main switch Qm is closed/turned on), current 301 through boost inductor Lb begins linearly increasing, which can be seen in FIG. 4. This stores energy in boost inductor Lb for delivery to the load when main switch Qm opens. At the same time, resonant current 302 begins decreasing, eventually reversing at time t2 (FIG. 4), which marks the transition to block (d).

In block (d), which begins at time t2 and continues until main switch Qm is opened at time t3, resonant current 302 has reversed and continues decreasing (becoming more negative). As a result, switch current 304 becomes the sum of the boost inductor current 301 and the resonant current 302 (which can be seen in FIG. 4). When boost inductor current 301 reaches a peak value (determined, for example, by a current window controller as discussed below), main switch Qm is opened at time t3 (FIG. 4). This marks the beginning of block (e) of FIG. 3.

Block (e) of FIG. 3 begins at time t3 (FIG. 4) when main switch Qm is opened and continues until time t4 (FIG. 4) when synchronous rectifier switch Qa closes. During this time period, because switch Qm has opened, but current 301 through boost inductor Lb and resonant inductor Lr cannot change instantaneously, output current/synchronous rectifier current 303 begins to flow through the intrinsic body diode of synchronous rectifier switch Qa. This output/synchronous rectifier current 303 through the body diode of synchronous rectifier switch Qa allows switch Qa to be closed in a ZVS condition. As a result of this ZVS event, switching losses associated with the synchronous rectifier may be reduced. Additionally, the on resistance of synchronous rectifier switch Qa may be lower than the on resistance of a conventional diode, further allowing for reduced conduction losses. It will also be appreciated that output current/synchronous rectifier current 303 will begin increasing very rapidly, meaning that the time between opening main switch Qm at t3 and closing synchronous rectifier switch Qa at time t4 may be very short, such as a dead time tdead selected to guarantee that there is no cross conduction between the main switch Qm and the synchronous rectifier switch Qa.

Block (f) of FIG. 3 begins at time t4 when synchronous rectifier switch Qa is closed and continues until time t5 when resonant current reverses, marking the transition to block (a) of FIG. 3, discussed above. During block (f), i.e., between time t4 and time t5, boost inductor current 301 is decreasing as energy is transferred to the load via output current/synchronous rectifier current 303. Additionally, resonant current 302 begins at its negative peak and begins increasing. During this time, the decrease in boost inductor current results in a corresponding decrease in output current/synchronous rectifier current 303. Once the resonant current 302 reverses, block (a) (discussed above) begins again, repeating the switching cycle.

In addition to the current waveforms of FIG. 4 discussed above, FIG. 4 also depicts the switching waveforms for main switch Qm and synchronous rectifier switch Qa. More specifically, main switch switching waveform 402 is high when main switch Qm is turned on (e.g., from t1 to time t3) and low otherwise. Similarly, synchronous rectifier switch switching waveform 403 is high when synchronous rectifier switch Qa is turned on (e.g., from time t4 to time t6) and low otherwise. The total switching period Tsw is the time from the beginning of one switching cycle (e.g., when main switch Qm is turned on at time t1) to the beginning of the next switching cycle (e.g., when main switch Qm is turned on again). Between the time either switch is turned off and the complementary switch is turned on, there is a dead time tdead (e.g. from t0 to t1 or t3 to t4) which is implemented to prevent cross conduction between the two switches that would short out the DC bus. Also illustrated in FIG. 4 is voltage waveform 404, which is the voltage across main switch Qm. As can be seen, this voltage varies between zero (when the switch is turned on, i.e., closed) and the DC bus voltage (when the switch is turned off, i.e., open). There is also a slight upward excursion 404a associated with the turn off of Qm, which occurs while current is building through the body diode of synchronous rectifier switch Qa before the Qa is closed (i.e., turned on).

In some embodiments, main switch Qm may be switched with a fixed frequency (i.e., Tsw remains constant). The duty cycle of Qm may thus be controlled to regulate the output voltage. The synchronous rectifier switch Qa may be switched complementarily to the main switch (with the dead times described above). Thus, the duty cycle D of main switch Qm may be given by Ton/Tsw, and the synchronous rectifier switch will have a complementary duty cycle 1-D or 1-Ton/Tsw. The duty cycle D of main switch Qm may be controlled by a current window controller (as illustrated below with respect to FIG. 6), or by any other suitable control algorithm.

Figure 5:
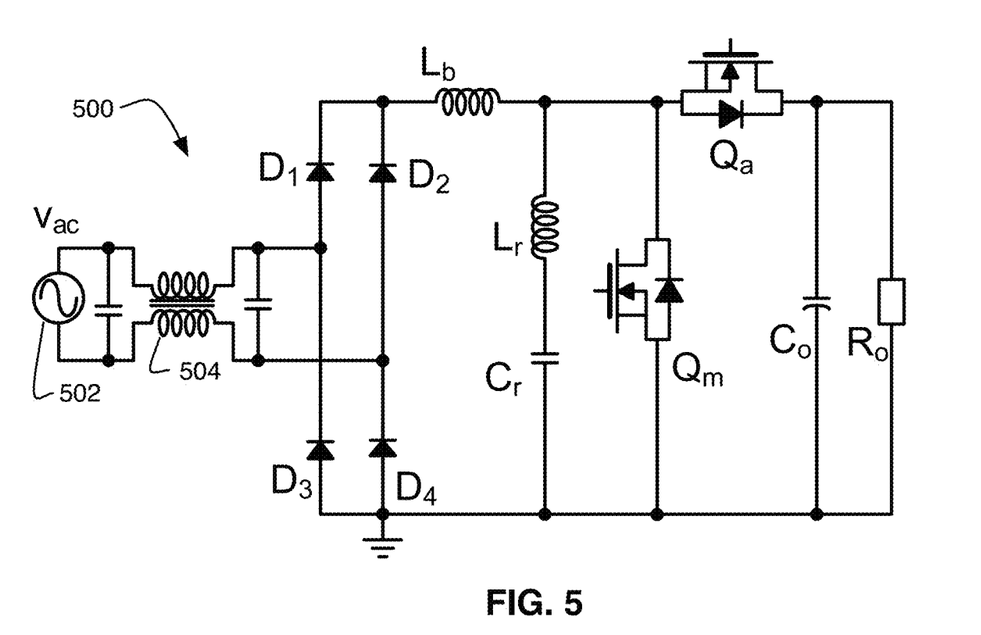
FIG. 5 illustrates an AC-DC converter having a power factor corrected boost converter with zero voltage switching.

Turning now to FIG. 5, the ZVS DC/DC boost converter discussed above may be used in an AC-DC converter 500. The AC-DC converter 500 may receive an AC input voltage 502. Input AC voltage 502 may be supplied, for example, by mains power having an RMS voltage in the range of 90V to 264V and a frequency in the range of 50 to 60 Hz. (Most countries' mains supply fall in this range.) Input AC voltage passes through EMI filter 504 (made up of capacitors and a common-mode choke). This EMI filtered voltage is then supplied to a full bridge rectifier made up of diodes D1-D4 and produces a DC voltage VDC appearing across the upper and lower rails of the boost converter. EMI filter 504 can serve at least two functions. A first function of the EMI filter is to isolate the AC mains supply from electromagnetic interference caused by the switching operations of main switch Qm and synchronous rectifier switch Qa discussed above. An additional function of the EMI filter is to filter the high switching harmonic frequency components involving the current drawn by the boost converter approximately sinusoidal (at the frequency of the mains supply) and approximately in phase with the AC input voltage. This can allow for more pure sinusoidal AC input current with reduced sub-harmonic frequencies and facilitate regulatory compliance, as regulations generally require power factor corrected power supplies when operating at a level above 70 watts.

Figure 6:
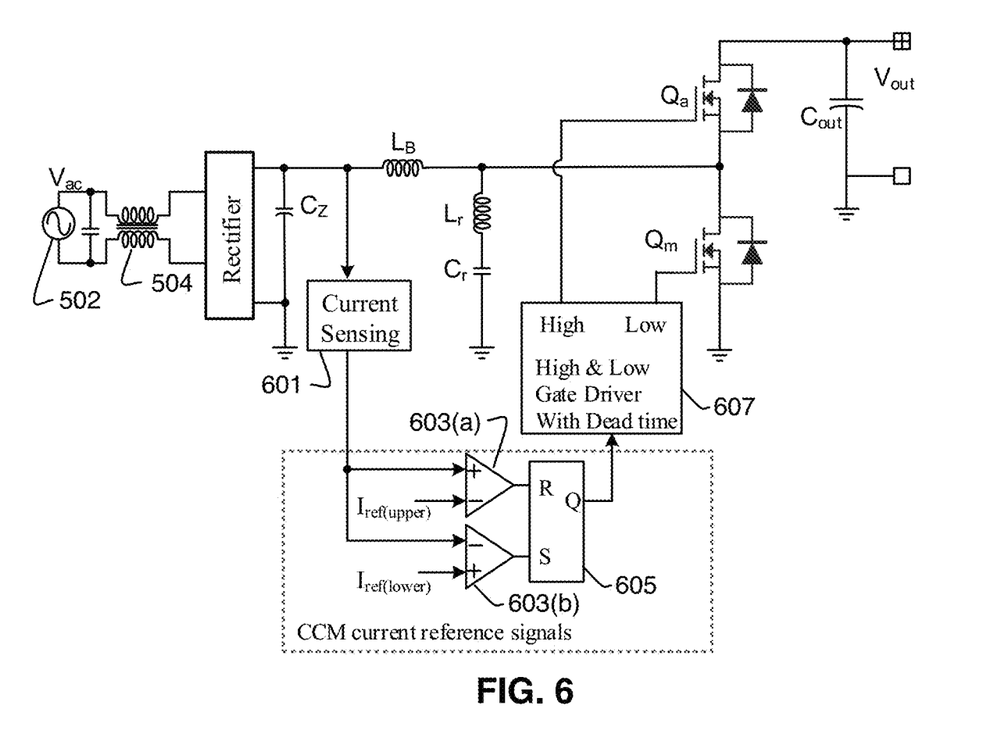
FIG. 6 illustrates an AC-DC converter having a power factor corrected boost converter with zero voltage switching and the associated control circuitry.

FIG. 6 illustrates the AC-DC converter of FIG. 5 with continuous current mode control circuitry. More specifically, the control circuitry includes current sensor module 601, which measures the boost inductor current 301 through boost inductor Lb. Current sensor module 601 may be implemented by any of a variety of known current sensing circuits, including current sensing resistors, current shunts, Hall effect sensors, and the like. The sensed boost inductor current is provided to the non-inverting inputs of a pair of comparators 603(a) and 603(b). Comparator 603(a) has its non-inverting input coupled to an upper reference current Iref(upper). Comparator 603(b) has its non-inverting input coupled to a lower reference current Iref(lower). The output comparator 603(a) is coupled to the reset input of R-S flip-flop 605, while the output of comparator 603(b) is coupled to the set input of R-S flip-flop 605. The output (Q) of R-S flip-flop 605 is coupled to a gate driver circuit 607.

When the measured boost inductor current reaches the upper current reference Iref(upper), the reset terminal of flip-flop 605 is triggered, which causes gate drive circuit 607 to turn off main switch Qm. This corresponds to the peak inductor current 602 illustrated in FIG. 4. As discussed above, after a short dead time, the gate drive circuit turns on synchronous rectifier switch Qa. This causes the boost inductor current to begin decreasing. When the measured boost inductor current reaches Iref(lower), the set terminal of flip-flop 605 is triggered, causing the output Q to change states, signaling gate driver 607 to turn off synchronous rectifier switch Qa and, after a suitable dead time, turn on main switch Qm. It will be appreciated that the upper and lower current reference signals may be controlled by an output voltage feedback loop to maintain the output voltage Vo at a desired regulated DC voltage.

Described above are various features and embodiments relating to zero voltage switching for boost converters. Such regulators may be used in a variety of applications, but may be particularly advantageous when used in conjunction with portable electronic devices such as mobile telephones, smart phones, tablet computers, laptop computers, media players, and the like, as well as the peripherals associated therewith. Such associated peripherals can include input devices (such as keyboards, mice, touchpads, tablets, and the like), output devices (such as headphones or speakers), storage devices, or any other peripheral.

Additionally, although numerous specific features and various embodiments have been described, it is to be understood that, unless otherwise noted as being mutually exclusive, the various features and embodiments may be combined in any of the various permutations in a particular implementation. Thus, the various embodiments described above are provided by way of illustration only and should not be constructed to limit the scope of the disclosure.

The invention claimed is:

1. A zero voltage switching boost converter comprising:
   a DC voltage bus;
   a boost inductor coupled to the DC voltage bus;
   a main switch configured to selectively store energy from the DC voltage bus in the boost inductor and deliver energy from the boost inductor to a load connected to the boost converter;
   a synchronous rectifier switch configured to allow current flow from the boost inductor to the load and to prevent current flow from the load to the boost inductor;
   a resonant circuit comprising a resonant capacitor and a resonant inductor coupled across the main switch, wherein the resonant circuit allows for zero voltage switching of the main switch and the synchronous rectifier switch; and
   a current window controller configured to control a duty cycle of the main switch to maintain a boost inductor current between an upper reference current and a lower reference current wherein the current window controller comprises:
      a first comparator configured to compare a measured boost inductor current to the upper reference current; and
      a second comparator configured to compare the measured boost inductor current to the lower reference current.

2. The zero voltage switching boost converter of claim 1 wherein the resonant circuit is a series resonant circuit.

3. The zero voltage switching boost converter of claim 1 wherein the boost converter is operated in a continuous current mode.

4. The zero voltage switching boost converter of claim 3 wherein the main switch is switched at a constant frequency and a duty cycle of the main switch is controlled to regulate an output voltage of the converter.

5. The zero voltage switching boost converter of claim 4 wherein the auxiliary switch is switched complementarily to the main switch.

6. The zero voltage switching boost converter of claim 1 wherein there is a dead time between switching off one of the main switch and the auxiliary switch and switching on the other of the main switch and the auxiliary switch.

7. The zero voltage switching boost converter of claim 1 wherein the current window controller further comprises a current sensor configured to measure current through the boost inductor and provide the measured boost inductor current to the first and second comparators.

8. The zero voltage switching boost converter of claim 1 wherein the current window controller further comprises:
   a flip-flop having its inputs coupled to the outputs of the first and second comparators; and
   a gate driver circuit having an input coupled to an output of the flip-flop and its outputs coupled to gate terminals of the main switch and the synchronous rectifier switches, wherein the gate driver circuit is configured to complementarily switch the main switch and the auxiliary switch with a dead time between switching events.

9. A power factor corrected AC-DC converter comprising:
   an electromagnetic interference filter configured to receive an AC input voltage and generate a filtered AC voltage;
   a first rectifier coupled to the electromagnetic interference filter and configured to rectify the filtered AC voltage to produce a DC bus voltage;
   a boost inductor coupled to the DC voltage bus;
   a main switch configured to selectively store energy from the DC voltage bus in the boost inductor and deliver energy from the boost inductor to a load connected to the boost converter;
   a synchronous rectifier switch configured to allow current flow from the boost inductor to the load and to prevent current flow from the load to the boost inductor;
   a resonant circuit comprising a resonant capacitor and a resonant inductor coupled across the main switch, wherein the resonant circuit allows for zero voltage switching of the main switch and the synchronous rectifier switch; and
   a current window controller configured to control a duty cycle of the main switch to maintain a boost inductor current between an upper reference current and a lower reference current, wherein the current window controller comprises:
      a first comparator configured to compare a measured boost inductor current to the upper reference current;
      a second comparator configured to compare the measured boost inductor current to the lower reference current.

10. The power factor corrected AC-DC converter of claim 9 wherein the resonant circuit is a series resonant circuit.

11. The power factor corrected AC-DC converter of claim 9 wherein the boost converter is operated in a continuous current mode.

12. The power factor corrected AC-DC converter of claim 9 wherein the main switch is switched at a constant frequency and a duty cycle of the main switch is controlled to regulate an output voltage of the converter.

13. The power factor corrected AC-DC converter of claim 12 wherein the auxiliary switch is switched complementarily to the main switch.

14. The power factor corrected AC-DC converter of claim 13 wherein there is a dead time between switching off one of the main switch and the auxiliary switch and switching on the other of the main switch and the auxiliary switch.

15. The power factor corrected AC-DC converter of claim 9 wherein the current window controller further comprises a current sensor configured to measure current through the boost inductor and provide the measured boost inductor current to the first and second comparators.

16. The power factor corrected AC-DC converter of claim 9 wherein the current window controller further comprises:
    a flip-flop having its inputs coupled to the outputs of the first and second comparators; and
    a gate driver circuit having an input coupled to an output of the flip-flop and its outputs coupled to gate terminals of the main switch and the synchronous rectifier switches, wherein the gate driver circuit is configured to complementarily switch the main switch and the auxiliary switch with a dead time between switching events.

17. A power converter comprising:
    a DC voltage bus;
    a boost inductor having a first terminal coupled to a high rail of the DC voltage bus;
    a synchronous rectifier switch having a first terminal coupled to a second terminal of the boost inductor and a second terminal configured to be coupled to a load, wherein the rectifier is configured to allow current flow from the boost inductor to the load and to prevent current flow from the load to the boost inductor;

a main switch coupled between a junction of the second terminal of the boost inductor and the first terminal of the rectifier and the low rail of the DC voltage bus; and a series resonant circuit in parallel with the main switch; and a current window controller, wherein:

the current window controller switches the main switch at a constant frequency and a variable duty cycle to maintain current through the boost inductor between an upper reference current and a lower reference current, thereby maintaining a regulated output voltage at the load by selectively storing energy from the DC voltage bus in the boost inductor and delivering energy from the boost inductor to a load connected to the boost converter, the current window controller comprising a first comparator configured to compare a measured boost inductor current to the upper reference current; and a second comparator configured to compare the measured boost inductor current to the lower reference current;

the auxiliary switch is switched complementarily to the main switch; and the series resonant circuit allows for zero voltage switching of the main switch and the auxiliary switch.

18. The power converter of claim 17 further comprising an electromagnetic interference filter configured to receive an AC input voltage and generate a filtered AC voltage and a second rectifier having an input coupled to the electromagnetic interference filter and an output coupled to the DC bus, wherein the rectifier is configured to rectify the filtered AC voltage to produce a DC bus voltage.

19. A power converter comprising:

a boost inductor having a first terminal coupled to a DC voltage bus;

a main switch connected to a second terminal of the boost inductor and configured to alternately close to store energy from the DC voltage bus in the boost inductor and open to deliver energy from the boost inductor to a load;

a synchronous rectifier switch connected to the second terminal of the boost inductor and to the main switch, switched complementarily to the main switch and thereby configured to allow current flow from the boost inductor to the load and to prevent current flow from the load to the boost inductor;

a resonant circuit comprising a series-connected resonant capacitor and resonant inductor, the resonant circuit being coupled in parallel with the main switch, wherein the resonant circuit allows for zero voltage switching of the main switch and the synchronous rectifier switch; and a current window controller configured to control a duty cycle of the main switch to maintain a boost inductor current between an upper reference current and a lower reference current; wherein the current window controller comprises comparison circuitry configured to compare a measured boost inductor current to the upper reference current and comparison circuitry configured to compare a measured boost inductor current to the lower reference circuit.

20. The power converter of claim 19 wherein the boost converter is operated in a continuous current mode.

21. The power converter of claim 19 wherein:

the comparison circuitry configured to compare a measured boost inductor current to the upper reference current comprises a first comparator;

the comparison circuitry configured to compare a measured boost inductor current to the lower reference current comprises.

22. The power converter of claim 19 wherein there is a dead time between switching off one of the main switch and the auxiliary switch and switching on the other of the main switch and the auxiliary switch.

23. The power converter of claim 20 wherein the main switch is switched at a constant frequency and a duty cycle of the main switch is controlled to regulate an output voltage of the converter.

24. The power converter of claim 20 wherein the current window controller comprises circuitry configured to compare a measured boost inductor current to an upper reference current and a lower reference current and to control the duty cycle of the main switch to maintain a boost inductor current between the upper reference current and the lower reference current.

* * * * *